Jan. 25, 1949.  M. C. BLOOM  2,459,787
METAL RECTIFIER BRIDGE
Filed Sept. 24, 1945
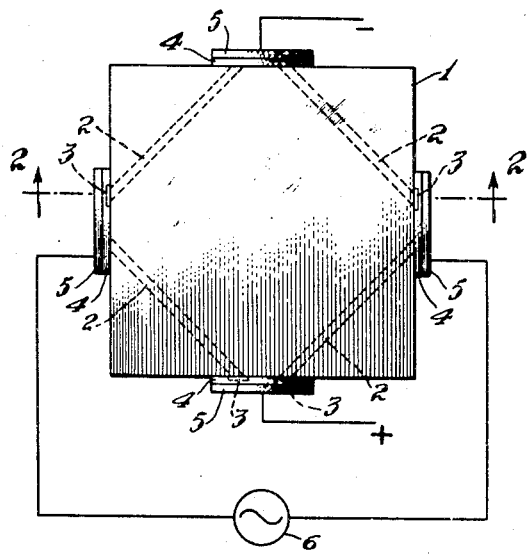
Fig. 1
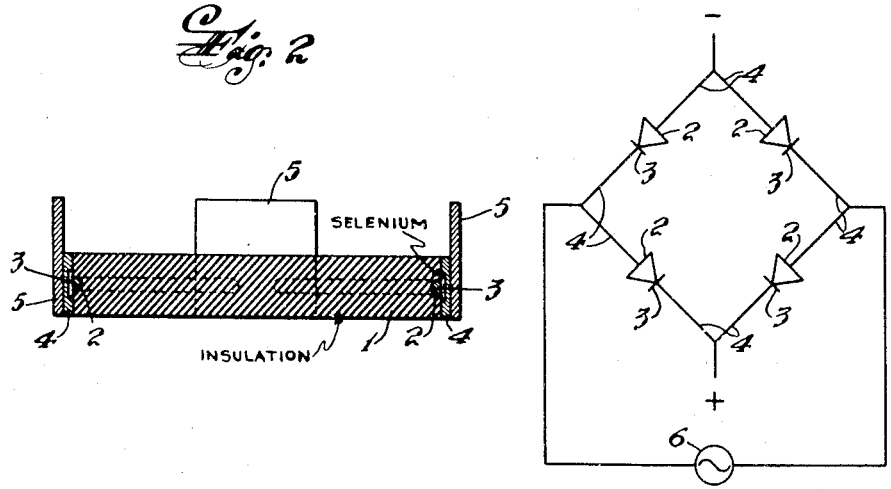
Fig. 2
Fig. 3
INVENTOR.
Mortimer C. Bloom
BY
Geo. G. Hyde
ATTORNEY Patented Jan. 25, 1949

2,459,787

UNITED STATES PATENT OFFICE 2,459,787

METAL RECTIFIER BRIDGE

Mortimer C. Bloom, Newton Highlands, Mass., assignor, by mesne assignments, to Federal Telephone and Radio Corporation, New York, N. Y., a corporation of Delaware Application September 24, 1945, Serial No. 618,337

8 Claims. (Cl. 175—366)

This invention relates to metal rectifiers and particularly to combinations of such rectifiers to form full wave rectifier bridges. Bridges of this type are generally constructed by appropriately interconnecting four rectifier units mounted to form a stack or stacks. A general object of the invention is to provide a simplified unitary rectifier bridge construction which dispenses with stacks and other conventional types of mounting. This is in general accomplished by a special mounting arrangement in which the rectifier units are held in place by a body of insulating material in such manner that opposite rectifying and conducting faces of the rectifier units are exposed, and by interconnecting such surfaces in a convenient manner to provide the bridge circuit.

Another purpose of the invention is to provide a unitary bridge structure in which metal rectifier elements are embedded in a body of insulating material, arranged for convenient production from plastic insulating materials, such as thermosetting synthetic resins, glass and the like, into which the metal rectifier elements are introduced while the material is in the form of a plastic matrix.

Another object is to provide a rectifier bridge structure of the indicated type suitable for use where high rectifier resistances are desirable to prevent appreciable current drain, bridges of this type being particularly useful in connection with meters and other instruments. The desired resistance is obtained by forming rectifier elements having very small area, and consequently high resistance, on the ends of small rods or wires, which are embedded in the insulating material, the ends of the rods or wires being located at the faces of the insulating body in position for convenient interconnection to form the bridge circuit.

Other objects and advantages will appear from the following description, considered in connection with the accompanying drawing in which:

Fig. 1 is a plan view of an instrument rectifier bridge embodying the invention;

Fig. 2 is a transverse sectional view on line 2—2 of Fig. 1; and

Fig. 3 is a diagram of a rectifier bridge numbered for convenience in identifying the bridge circuit in Figs. 1 and 2.

The rectangular body 1 is made of a suitable insulating synthetic resin, such as the thermosetting resins known by the trade-marks "Bakelite," "Durez" and "Plaskon." Four wires 2 are embedded in the body 1 in such manner that the ends are exposed at surfaces of the body in contiguous pairs. In the illustrated arrangement the wires 2, made of suitable base plate metal such as steel or aluminum, are arranged in the form of a square with truncated corners, so that two wire ends are exposed adjacent the center of each side of the square body 1.

Layers 3 of an appropriate blocking layer material, such as selenium, are applied to appropriate wire ends, these layers being applied to the lower ends of the wires 2 as viewed in Fig. 1. The blocking layer material may be applied by standard methods, such as fuming, pressed powder or melting and subsequent heat treatment, electrodeposition or the like, in the case of selenium; and the body 1 will of course be formed of material that will stand the heat and pressure incidental to the selected method of application. In each instance the wire ends which are not to be coated will of course be suitably shielded or screened if necessary.

An interconnecting or counter-electrode layer 4, which may be Wood's metal, then applied in the usual manner across each pair of adjacent wire ends, as by spraying; and suitable connectors may be applied or attached to the counter-electrode layer. The disclosed arrangement includes short connector blocks 5 of conducting metal attached to the counter-electrode layers 4, which may be accomplished by heating the blocks until the adjacent counter-electrode surfaces are melted and adhere to the lower parts of the blocks, which project above the body 1 in position for making appropriate connection.

With this arrangement a unitary rectifier bridge is provided, arranged for connection of the side blocks 5 (as viewed in Fig. 1) to the source 6 of alternating current, the top and bottom blocks 5 providing negative and positive connections for the direct current circuit. The relationship of the various wire ends and connecting counter-electrodes 4 forming the bridge will be apparent from Fig. 3.

The illustrated embodiment is intended as an instrument rectifier bridge, the necessary high resistance and consequent low current drain being provided by the small cross-section of the wire ends to which the rectifying metal is applied. The indicated arrangement is particularly desirable for this use, since it provides a completely unitary bridge structure, with all operating parts protected, which is compact and can be readily designed to fit into small spaces in various instruments.

However, the invention is not limited to this particular arrangement, since the diameters of the elements illustrated as wires may be increased to provide greater current capacity for other uses, and the resulting rods, blocks or plates may be suitably rearranged to conform to the mechanical requirements introduced by such an increase in cross-section. Likewise, although only a single wire has been shown in each leg of the bridge, this is not intended as a limitation. The construction may also be varied by employing other physical arrangements of the wires or rods 2 and other forms and dimensions of the body without departing from the fundamental principles of the invention.

While a preferred embodiment of the invention has been illustrated and certain variations have been indicated, other modifications and changes may be made without departing from the invention as set forth in the claims.

What is claimed is:

1. A metal rectifier bridge unit comprising a body of insulating material, a plurality of metal rectifier elements, each having a rectifying portion and a conducting portion, disposed over different portions of the bounding surface of said body, the respective portions of each of said elements being connected by an extension of said conducting portion through said body, and connecting members connecting selected adjacent ones of said rectifier element portions to form a rectifier bridge construction.

2. A bridge unit at set forth in claim 1 in which the rectifier elements are arranged in an annular series.

3. A bridge unit as set forth in claim 1 in which the connecting members constitute counter-electrodes at said rectifying portions.

4. A metal rectifier bridge unit comprising a body of insulating material, four metal rectifier elements each having a rectifying portion and a conducting portion and extending through the body with said portions exposed at the body surface, each of said rectifying portions of an element being located adjacent to one of said conducting portions of a different element, and four connecting members each connecting a pair of said adjacent portions, arranged to form a unitary rectifier bridge construction.

5. A bridge unit as set forth in claim 4 in which the rectifier elements include elongated intermediate portions extending through the body in transverse alignment, arranged in an annular series.

6. A metal rectifier bridge unit comprising a body of insulating material, a plurality of elements, each element comprising an asymmetric portion and a conducting portion disposed over different portions of the bounding surface of said body and coupled together by means extending through said body, coupling means external of said body coupling selected ones of said disposed portions.

7. A bridge unit as set forth in claim 6, wherein said asymmetric portions each comprises a counter electrode portion, wherein said counter electrode portions extended to make conductive contact with other ones of said selected portions.

8. A metal rectifier bridge unit that comprises a body of insulating material; a plurality of electrical conductors, extending through portions of said body, having ends exposed at boundaries of said body; a layer of asymmetrically conductive material on one end of each of the said conductors; and isolated areas of counterelectrode material overlying and bridging neighboring pairs of ends of the conductors whereby the asymmetrically conductive layers are electrically connected as a full wave rectifier bridge.

MORTIMER C. BLOOM.

REFERENCES CITED

The following references are of record in the file of this patent:

UNITED STATES PATENTS

| Number | Name | Date |
|---|---|---|
| 1,898,321 | Strobel | Feb. 21, 1933 |
| 2,215,667 | Sherman | Sept. 24, 1940 |
| 2,369,185 | Skinker | Feb. 13, 1945 |

FOREIGN PATENTS

| Number | Name | Date |
|---|---|---|
| 264,052 | Great Britain | Jan. 13, 1927 |